United States Patent
Muschett et al.

(10) Patent No.: US 7,881,938 B2
(45) Date of Patent: Feb. 1, 2011

(54) SPEECH BOOKMARKS IN A VOICE USER INTERFACE USING A SPEECH RECOGNITION ENGINE AND ACOUSTICALLY GENERATED BASEFORMS

(75) Inventors: Brien H. Muschett, Palm Beach Gardens, FL (US); Julia A. Parker, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 805 days.

(21) Appl. No.: 11/691,893

(22) Filed: Mar. 27, 2007

(65) Prior Publication Data

US 2008/0243517 A1 Oct. 2, 2008

(51) Int. Cl.
*G10L 15/22* (2006.01)
(52) U.S. Cl. .................................. 704/270.1; 704/257
(58) Field of Classification Search .............. 704/270, 704/270.1, 275, 257
See application file for complete search history.

(56) References Cited

U.S. PATENT DOCUMENTS

| | | | |
|---|---|---|---|
| 6,094,632 A | 7/2000 | Hattori | |
| 6,707,889 B1 * | 3/2004 | Saylor et al. | 379/88.04 |
| 6,751,594 B1 | 6/2004 | Diehl et al. | |
| 6,785,653 B1 * | 8/2004 | White et al. | 704/270.1 |
| 6,859,776 B1 * | 2/2005 | Cohen et al. | 704/270 |
| 6,985,865 B1 * | 1/2006 | Packingham et al. | 704/275 |
| 7,158,936 B2 * | 1/2007 | Denenberg et al. | 704/270.1 |
| 7,302,392 B1 * | 11/2007 | Thenthiruperai et al. | 704/251 |
| 7,313,525 B1 * | 12/2007 | Packingham et al. | 704/270 |
| 2003/0088422 A1 * | 5/2003 | Denenberg et al. | 704/275 |
| 2004/0193403 A1 * | 9/2004 | Creamer et al. | 704/201 |
| 2004/0205614 A1 * | 10/2004 | Keswa | 715/523 |

OTHER PUBLICATIONS

Cross, C., et al., "XHTML + Voice Profile 1.1", IBM Corp., Jan. 28, 2003.

* cited by examiner

*Primary Examiner*—Abul Azad
(74) *Attorney, Agent, or Firm*—Wolf, Greenfield & Sacks, P.C.

(57) ABSTRACT

A system and method for navigating a dialog hierarchy from a voice user interface (VUI) using speech bookmarks. The method can detect a user spoken command for bookmarking a location within a dialog hierarchy of a voice response system. A user spoken bookmark can be received, which is added to a personalized bookmark grammar that is associated with a user who spoke the bookmark name. A database record can be used to associate the new bookmark name with a location within the dialog hierarchy. During a subsequent interaction between the user and the voice response system, the user can speak the bookmark name, which results in a match being detected between the spoken phrase and the personalized bookmark grammar. The voice response system can then navigate to the location within bookmark hierarchy that is associated with the speech bookmark.

26 Claims, 2 Drawing Sheets

| User Request 210 | System Response 215 |
|---|---|
|  | 220 Welcome to ABC Bank. Please enter your id using the keypad on your phone. |
| 222 User enters their id. | 224 Please enter your pin code using the keypad on your phone. |
| 226 User enters their pin code. | 228 Welcome John Smith. This is the Main Menu. Please choose from the following: Press 1 or say "Balance". Press 2 or say "Fund Information". Press 3 or say "Fund Transfer". Press 4 or say "Customer Representative". You can say "main menu" at any time to go back. |
| 230 The user says "Balance". | 232 Press 1 or say "Checking". Press 2 or say "Savings". Press 3 or say "Money market". Press 4 or say "Brokerage". You can say "main menu" at any time to go back. |
| 234 The user says "Checking". | 236 You currently have five hundred dollars in your checking account. |
| 238 The user says "Bookmark". | 240 Please say the bookmark word or say cancel. |
| 242 The user says "my money" | 244 You now have a bookmark to this location. 246 <the personal bookmark grammar with this new entry is enabled throughout the application.> |
| 248 Later, the user calls back into the application. | 250 Welcome to ABC Bank. Please enter your id using the keypad on your phone. |
| 252 User enters their id. | 254 Please enter your pin code using the keypad on your phone. |
| 256 User enters their pin code. | 258 Welcome John Smith. This is the Main Menu. Please choose from the following: Press 1 or say "Balance". Press 2 or say "Fund Information". Press 3 or say "Fund Transfer". Press 4 or say "Customer Representative". Or you may say <play audio of user saying "my money">. You can say "main menu" at any time to go back. |
| 260 My money | 262 <the application jumps to this part of the application> 264 You currently have five hundred dollars in your checking account. |

FIG. 2

SPEECH BOOKMARKS IN A VOICE USER INTERFACE USING A SPEECH RECOGNITION ENGINE AND ACOUSTICALLY GENERATED BASEFORMS

BACKGROUND

1. Field of the Invention

The present invention relates to the field of speech processing and, more particularly, to establishing speech bookmarks in a voice user interface (VUI) using a speech recognition engine and acoustically generated baseforms.

2. Description of the Related Art

A voice user interface (VUI) is an interface of an audio input/output device through which users can interact with computing systems through voice/speech platform in order to initiate a self service application. There are currently two main variants of VUIs, natural language VUIs and menu driven VUIs. A natural language VUI uses natural language understanding (NLU) technologies to accept free-form voice input from a user, to convert this input to text, to determine an intended meaning for the input, and to map this meaning to one or more programmatic actions. Current NLU technologies are proprietary and based on vendor-specific technologies instead of open standards, consume tremendous amounts of computing resources, and often have trouble correctly mapping meaning to specific software elements of interest. A menu driven VUI uses a hierarchy of menus, each having many user selectable options which can branch a user to different menus and/or can trigger a related programmatic action to execute.

In a menu driven VUI, navigating to a desired option can require a user to traverse a nested hierarchy of menus, until a desired option is available. Users can become quickly frustrated with delays incurred while navigating the dialog menus. Conventional navigation of menus results in longer than necessary communication sessions which consume infrastructure resources such as available communication ports and ability to handle additional calls. At present, no known automated response system or component permits users of a VUI to establish speech bookmarks to a user established point in a menu hierarchy.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 is a user interaction diagram illustrating a use of speech bookmarks in accordance with an embodiment of the inventive arrangements disclosed herein.

DETAILED DESCRIPTION OF THE INVENTION

Figure 1:
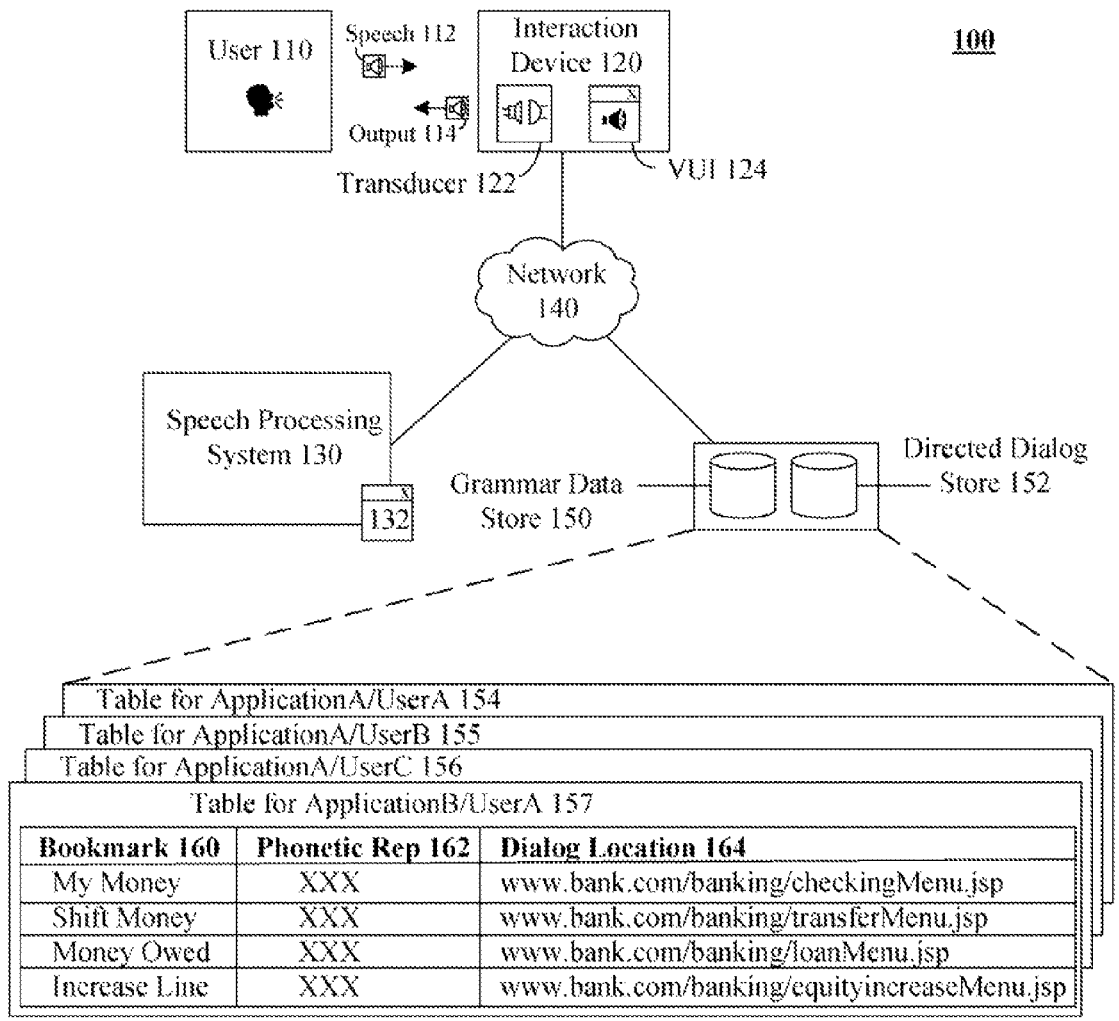
FIG. 1 is a schematic diagram of a system that permits users to establish speech bookmarks, which are associated with a configurable position in a menu hierarchy of a speech processing system.

FIG. 1 is a schematic diagram of a system 100 that permits users 110 to establish speech bookmarks which are associated with a configurable position in a menu hierarchy of a speech processing system 130. Once a speech bookmark has been established, initiating the speech bookmark can cause a dialog flow of system 100 to skip to a previously configured dialog location. System 100 can be performed using speech 112 commands alone and does not rely upon keystrokes or Graphical User Interface (GUI) controls. An exclusive use of voice-only commands can be highly advantageous in hands-free situations where interactions through keystrokes or GUI controls may be unfeasible or, where available, I/O peripherals are limited or nonexistent.

Use of speech bookmarks with a Voice User Interface (VUI) 124 leverages existing customer knowledge by providing a new navigation mechanism that is based upon known concepts typically associated with a GUI. That is, a typical user is somewhat familiar with Web-based bookmarks which are associated with Uniform Resource Identifier (URI) addressable locations accessible via a browser. Speech bookmarks use a similar concept, by permitting users to "bookmark" dialog menu locations using speech commands.

Speech bookmarks can be utilized in any speech processing system 130 that is enabled for acoustic grammar generation (e.g., voice enrolled grammars). Thus, speech bookmarks can be used in directed menu-based interaction device 120 which do not necessarily include a speech processing system 130 with complex statistical language models and/or resource intensive Natural Language Understanding (NLU) technologies. For example, the speech processing system 130 can be an out-of-the-box or commercial off-the-shelf solution able to create acoustic baseforms during an enrollment session initiated when a user 110 elects to create a speech bookmark. A new acoustic baseform (e.g., speech bookmark) can be added to a personalized bookmark grammar, a voice enrolled grammar contained in a grammar data store 150, during an enrollment phase. The personalized bookmark grammar can be specifically associated with the user 110 and a speech-enabled application 132. The speech enabled application 132 can manage content conveyed through the VUI 124. In one embodiment, the system 130 and VUI 124 can permit a user 110 to speak a previously stored speech bookmark at any time, which results in the dialog jumping to an associated dialog location.

As shown in system 100, a user 110 can convey speech 112 messages to an interaction device 120 (e.g., a telephone, a computer, or other such device) and receive automatically generated speech output 114. The speech 112 can include voice commands to create new speech bookmarks and/or voice commands to use a previously stored speech bookmark. Audio signals can be received and generated using one or more transducers 122 (e.g., microphone and speaker) of the device 120. VUI 124 can be a voice only and/or multimodal interface used for user 110 interactions with speech processing system 130.

The interaction device 120, the speech processing system 130, and data stores 150 and 152 can be communicatively linked via network 140. Network 140 can include hardware/software/firmware necessary to convey digital information encoded within carrier waves. Network 140 can include line based and wireless communication pathways.

The speech processing system 130 can include a speech recognition engine supporting voice and Dual Tone Multiple Frequency (DTMF) input. The speech recognition engine can include acoustic baseform services, such as those conforming to open standards (e.g., Media Resource Control Protocol Version 2). That is, users 110 can enroll new acoustic baseforms (e.g., speech bookmarks) in a personalized bookmark grammar in a grammar data store 150 used by the speech recognition engine. In one embodiment, the interaction device 120 can include a Voice XML Browser to interpret Voice XML based applications, such as automated response application 132. Dialog menus can be written in a dialog language (e.g., Voice XML) and stored in the directed dialog store 152.

In one embodiment, different dialog locations 164 associated with speech bookmarks 160 can be URI links, as shown by table 157. A phonetic representation 162 (stored in a personalized bookmark grammar in a grammar data store 150) for each speech bookmark can also be associated with each speech bookmark 160. Different speech applications 132 and user 110 combinations can have a unique set of speech bookmarks, as shown by tables 154-157.

FIG. 2 is a user interaction diagram 200 illustrating a use of speech bookmarks in accordance with an embodiment of the inventive arrangements disclosed herein. Dialog 200 can be performed in the context of a system 100 or any of a variety of systems configured to permit users to establish speech bookmarks. That is, the speech processing system can interact with a user through directed menu-driven dialogs. The user is able to establish speech bookmarks that are associated with dialog branches and user selectable options. After being established, a user can barge-in a dialog by speaking a previously established speech bookmark. Upon detection of a speech bookmark, the speech processing system can jump to the dialog branch associated with the voiced speech bookmark.

The dialog 200 can include a number of user requests 210 and system interactions 215 which can be conducted via a VUI. In step 220, a VUI announcement can play which prompts the user to enter a user identifier, which the user enters in step 222. In step 224, the VUI can prompt the user for a personal identification number (PIN) code, a password, an account number, or similar authorization code, which the user can provide in step 226. Step 228 can begin after a user has been successfully authorized. In step 228, a main menu prompt can be played along with a set of menu options and user selectors for these options.

In step 230, a user can say "Balance" to navigate to the first menu option. In step 232, the VUI can play a menu of choices associated with a balance, such as "Checking", "Savings", "Money Market" or "Brokerage". In step 234 a user can say "Checking" to indicate that they wish to receive a balance for their checking account. In step 236, the VUI can present the checking account balance amount to the user. The user can say "bookmark" to establish a new speech bookmark in step 238. In step 240, the VUI can prompt the user for a bookmark word, which the user provides in step 242.

At this point, any of several tests and/or speech processing actions can be performed. For example, a test can be performed to ensure that the speech bookmark is not acoustically similar to other speech commands contained within a speech recognition grammar. This speech recognition grammar can include system defined commands and user specified ones. A separate or special variant of this test can determine whether the new bookmark word clashes or is acoustically similar to pre-existing speech bookmarks. When a clash occurs, a user can be prompted to change either the clashing pre-existing bookmark word or the new bookmark word. Additionally, a speech processing consistency assurance operation can execute. This operation can repetitively prompt a user to speak the bookmark word to insure a minimum similarity threshold exists between spoken instances of the bookmark word which helps to guarantee that future spoken instances of the bookmark word will be properly recognized. Once the tests and/or speech processing actions have been satisfactorily completed, the new speech bookmark can be added to a speech recognition grammar.

The VUI can confirm that the speech bookmark has been successfully established in step 244. In step 246, any necessary changes to a speech-enabled application and/or speech processing system related to the new speech bookmark can be performed. For example, an active grammar for the speech-enabled application can be updated to include the speech bookmark. In step 248, the user can begin a different interactive session with the speech response system, which can be performed after a delay of any duration. In step 250, the VUI can play an initial announcement and can request a user to enter a user identifier. A user can input a user identifier in step 252. In step 254, the VUI can prompt the user for an authorization code, which the user can provide in step 256. After a user has been successfully authorized, a main menu prompt can be played along with a set of menu options and user selectors for these options, as shown by step 258. In step 260, a user can speak the phrase "My Money", which can be a previously established speech bookmark. In step 262, the speech-enabled application can jump to a customer balance dialog for a checking account, which is associated with the "My Money" bookmark. In step 264, the VUI can audibly present the user with their checking account balance.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for navigating a dialog hierarchy from a voice user interface, the method comprising:

detecting a user-spoken command for bookmarking a location within a dialog hierarchy of a voice response system;

receiving a user-spoken bookmark name;

adding the user-spoken bookmark name to a personalized bookmark grammar associated with a user who spoke the bookmark name;

storing a record that relates the added bookmark name to the location within the dialog hierarchy; and during a subsequent interaction between the user and the voice response system, receiving speech input from a user, the speech input comprising a second user-spoken command, the second user-spoken command including a desired bookmark name but not an additional command identifying the desired bookmark name as a bookmark name;

in response to receiving the second user-spoken command, comparing the desired bookmark name of the second user-spoken command to the personalized bookmark grammar, when the desired bookmark name of the second user-spoken command matches a bookmark name stored in the personalized bookmark grammar, navigating to the location within the dialog hierarchy that is related to the bookmark name.

2. The method of claim 1 further comprising:
audibly prompting for a name for a bookmark upon detecting the user spoken command, wherein the user spoken bookmark name is received as a response to the prompting step.

3. The method of claim 1 further comprising:
determining a Uniform Resource Identifier (URI) that corresponds to the location, wherein the storing step stores the determined URI in the record.

4. The method of claim 3, wherein the URI identifies a hyperlink anchor of a dialog language based document interpreted by the voice response system, wherein said dialog language is any language of a set of languages where the set of languages includes at least one language selected from a group consisting of VoiceXML and SALT.

5. The method of claim 3, wherein the URI is specific to a speech enabled application, wherein the bookmark name stored in the personalized bookmark grammar is limited to interactions involving the user and the speech enabled application, whereby other users have different user specific speech bookmarks stored within other personalized bookmark grammars.

6. The method of claim 1, wherein the personalized bookmark grammar is a voice enrolled grammar.

7. The method of claim 6, wherein the voice enrolled grammar is a Speech Recognition Grammar Specification compliant grammar.

8. The method of claim 6, wherein the voice enrolled grammar, which is used to add the speech bookmark, is configured to be referenced via a standard SRGS grammar.

9. The method of claim 1, wherein a software language in which the dialog hierarchy is specified is a dialog based language wherein said dialog language is any language of a set of languages where the set of languages includes at least one language selected from a group consisting of VoiceXML and SALT.

10. The method of claim 1, wherein the second user-spoken command consists of the desired bookmark name.

11. The method of claim 1, wherein the speech input consists of the desired bookmark name.

12. A computer system comprising:
a processor programmed to implement
a speech recognition engine to process user input regarding speech bookmarks, each speech bookmark corresponding to a dialog location of a hierarchy of menus of a speech-enabled application;
a grammar data store configured to store the user-spoken bookmark names corresponding to speech bookmarks; and
a voice user interface configured to permit voice-based interactions between a user and the speech-enabled application,
wherein the voice user interface determines that the user desires to access a bookmark in response to:
receiving speech input from a user through the voice user interface, the speech input comprising a user-spoken command, the user-spoken command including a desired bookmark name but not an additional command identifying the desired bookmark name as a bookmark name,
in response to receiving the user-spoken command, comparing the desired bookmark name to the user-spoken bookmark names, and
when the desired bookmark name matches a user-spoken bookmark name, determining that the user desires to access a bookmark corresponding to the user-spoken bookmark name.

13. The system of claim 12, wherein the hierarchy of menus is specified using a dialog based language, wherein said dialog language is any language of a set of languages where the set of languages includes at least one language selected from a group consisting of VoiceXML and SALT.

14. The system of claim 13, wherein each of the dialog locations is a URI specified location.

15. The system of claim 12, wherein the speech recognition engine is implemented using commercial off-the-shelf components.

16. The system of claim 12, wherein the speech recognition engine is implemented using open standards.

17. The system of claim 12, wherein speech recognition engine uses acoustic baseform services.

18. The system of claim 12, wherein each user of the computer system is associated with a set of user-specific speech bookmarks.

19. The system of claim 12, wherein the voice user interface is configured to present audio of the user-spoken bookmark names to the user.

20. The system of claim 19, wherein the voice user interface is configured to present the user-spoken bookmark names by audibly listing a set of user-spoken bookmark names.

21. The computer system of claim 12, wherein the user-spoken command consists of the desired bookmark name.

22. The computer system of claim 12, wherein the speech input consists of the desired bookmark name.

23. At least one storage device having encoded thereon instructions for execution on a computer system, the instructions, when executed, causing the computer system to carry out a method comprising:
detecting a user-spoken command for bookmarking a location within a dialog hierarchy of a voice response system;
receiving a user-spoken bookmark name;
adding the user-spoken bookmark name to a personalized bookmark grammar associated with a user who spoke the bookmark name;
storing a record that relates the added bookmark name to the location within the dialog hierarchy; and
during a subsequent interaction between the user and the voice response system,
receiving speech input from a user, the speech input comprising a second user-spoken command, the second user-spoken command including a desired bookmark name but not an additional command identifying the desired bookmark name as a bookmark name;
in response to receiving the second user-spoken command, comparing the desired bookmark name of the second user-spoken command to the personalized bookmark grammar,
when the desired bookmark name of the second user-spoken command matches a bookmark name stored in the personalized bookmark grammar, navigating to the location within the dialog hierarchy that is related to the bookmark name.

24. The method of claim 1, wherein determining that the user desires to access a bookmark in response to receiving the user-spoken bookmark name comprises determining that the user desired to access a bookmark based only on the bookmark name.

25. The at least one storage device of claim 23, wherein the second user-spoken command consists of the desired bookmark name.

26. The at least one storage device of claim 23, wherein the speech input consists of the desired bookmark name.

* * * * *